United States Patent
Moreland

(12) 
(10) Patent No.: US 6,490,965 B1
(45) Date of Patent: Dec. 10, 2002

(54) AIRLOCK ASSEMBLY SUPPORTING BLOOP DETECTION DEVICE

(76) Inventor: Robert Glenn Moreland, 601 Alma St. SE., Vienna, VA (US) 22180

( * ) Notice: Subject to any disclaimer, the term of this patent is extended or adjusted under 35 U.S.C. 154(b) by 0 days.

(21) Appl. No.: 09/873,884

(22) Filed: Jun. 4, 2001

(51) Int. Cl.[7] .................................................. C12G 1/08
(52) U.S. Cl. ........................ 99/277.1; 99/277; 426/11; 426/8
(58) Field of Search ............................. 99/277.1, 277, 99/276, 278; 210/473, 474, 475, 476; 426/15, 11, 8; 261/38, 39.1, 39.2, DIG. 19, DIG. 74

(56) References Cited

U.S. PATENT DOCUMENTS

| | | | |
|---|---|---|---|
| 4,627,280 A | 12/1986 | Hayashi et al. | 73/290 |
| 4,842,869 A | 6/1989 | Forino | 426/8 |
| 5,950,524 A | 9/1999 | Reitz et al. | 99/277.1 |

Primary Examiner—Reginald L. Alexander

(57) ABSTRACT

An airlock assembly for allowing fermentation gasses to escape from a sealed fermentation vessel and preventing ambient gasses from entering the fermentation vessel and including a structure for producing electrical signals that can be used to detect said escape of fermentation gasses.

2 Claims, 5 Drawing Sheets

AIRLOCK ASSEMBLY SUPPORTING BLOOP DETECTION DEVICE

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

1. Field of Invention

This invention relates to airlocks, specifically to an airlock assembly that provides a means to electronically detect air as it escapes from the airlock.

2. Discussion of Prior Art

These days, homebrewing has become a popular hobby. Many people produce fermented beverages, primarily beer and wine, in their own home. To produce a fermented beverage, yeast is added to a liquid containing sugar, the liquid being crushed grapes in the case of wine, or mashed barley in the case of beer. The yeast cells employ complicated metabolic reactions to produce, among other things, alcohol and carbon dioxide. It is important that no wild yeast or bacteria contaminate the fermenting beverage - producing undesirable flavors. To accomplish this, homebrewing requires a fermentation vessel that is fitted with an airlock The air lock allows fermentation gasses to escape the vessel, but does not allow surrounding air into the vessel. An economic fermentation vessel is typically fashioned by using a food grade plastic bucket, a tight fitting lid, and a two piece airlock FIG. 1 shows a typical prior art airlock commonly used in homebrewing. Gasses produced by fermentation enter the airlock through intake tube 12, which extends into the fermentation vessel 14 through a hole in stopper 16. Stopper 16 forms an airtight seal with fermentation vessel 14. Therefore, fermentation gasses can only escape through intake manifold 22, which is formed by intake tube 12. The airlock also consists of a reservoir 21 for holding a fluid such as water, and an airlock partition 18. Airlock partition 18 is in the shape of a cup and covers the portion of the intake tube that is inside the reservoir 21. The interior of the fermentation vessel is isolated from the ambient air by filling the reservoir with a fluid such that the initial fluid level is between the opening of the airlock partition 18 and the top of the intake tube 12. As the fermentation process causes the pressure within the intake manifold 22 to increase, the airlock partition 18 rises above the top of the intake manifold 12 and the fluid level inside the airlock partition 18 lowers. When a sufficient pressure inside the intake manifold 22 is reached, fermentation gasses escape from under airlock partition 18. This causes airlock partition 18 to fall back toward intake tube 12, producing a "bloop" sound The fermentation gasses escape the airlock through airlock lid holes 26 or through the seal between airlock lid 24 and the reservoir container 28. Various types of similar airlocks can be found in prior art. One example is found in U.S. Pat. No. 5,950,524, issued to C Reitz et al on Sep. 14, 1999.

While these devices are suited for their intended usage, none of them provide a means to produce an electrical signal when fermentation gasses escape from the airlock.

SUMMARY

In order to track fermentation progress, homebrewers observe the air escaping form the airlock Since it is impractical to watch the air lock for the entire fermentation cycle, a device that can monitor the escaping air from the airlock and produce an electrical signal that can be recorded on a device, such as a personal computer, is desirable. This invention is an airlock that produces an electrical signal each time air escapes from the airlock.

SUMMARY OF THE INVENTION

It is an object of the present invention to provide an airlock that generates electrical signals that indicate gasses have flowed from the intake manifold to the ambient atmosphere. It is another object of this invention to monitor said electrical signals, and produce a second electrical signal that distinctly indicates the event of gas escaping from said airlock A third object of this invention to detect gasses escaping from the airlock using an induction coil that has a non-critical tolerance.

In order to attain above objects, the present invention comprises an airlock with a partition which rises as gas collects in the intake manifold, a solenoid type induction coil wound around a non-conductive hollow tube, a ferrite core disposed inside said induction coil such that movement of the core causes a change in the inductance of the coil, a connecting rod which attaches said core to said airlock partition, an oscillator circuit that produces a square wave output and uses said inductive coil is used as an inductive element, a processor which counts the number of rising or falling edges of said square wave for a period of time, stores a history of such counts, and determines if air has escaped from said airlock by performing statistic analysis on said stored counts.

Further objects and advantages of the present invention will become apparent from a consideration of the drawings and ensuing description.

DETAILED DESCRIPTION

Figure 1:
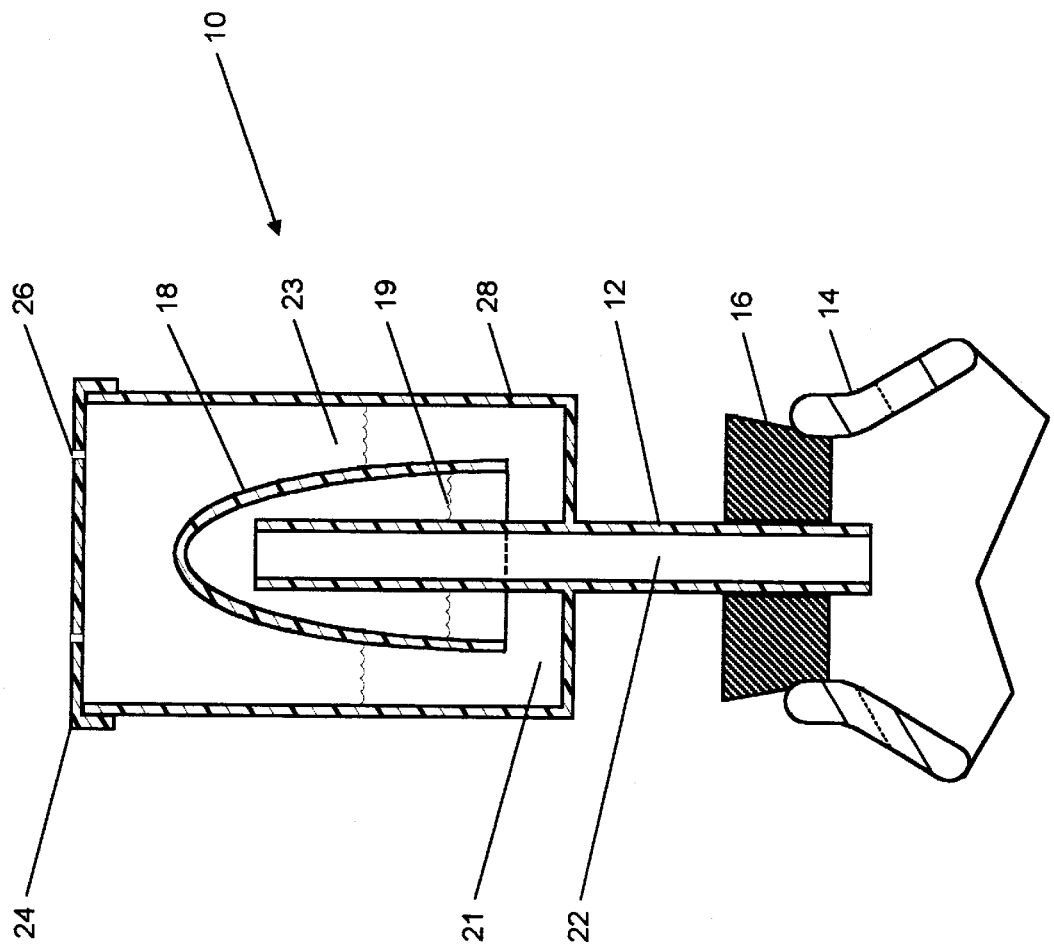
FIG. 1 shows a cross section of a known airlock (prior art).
Figure 2:
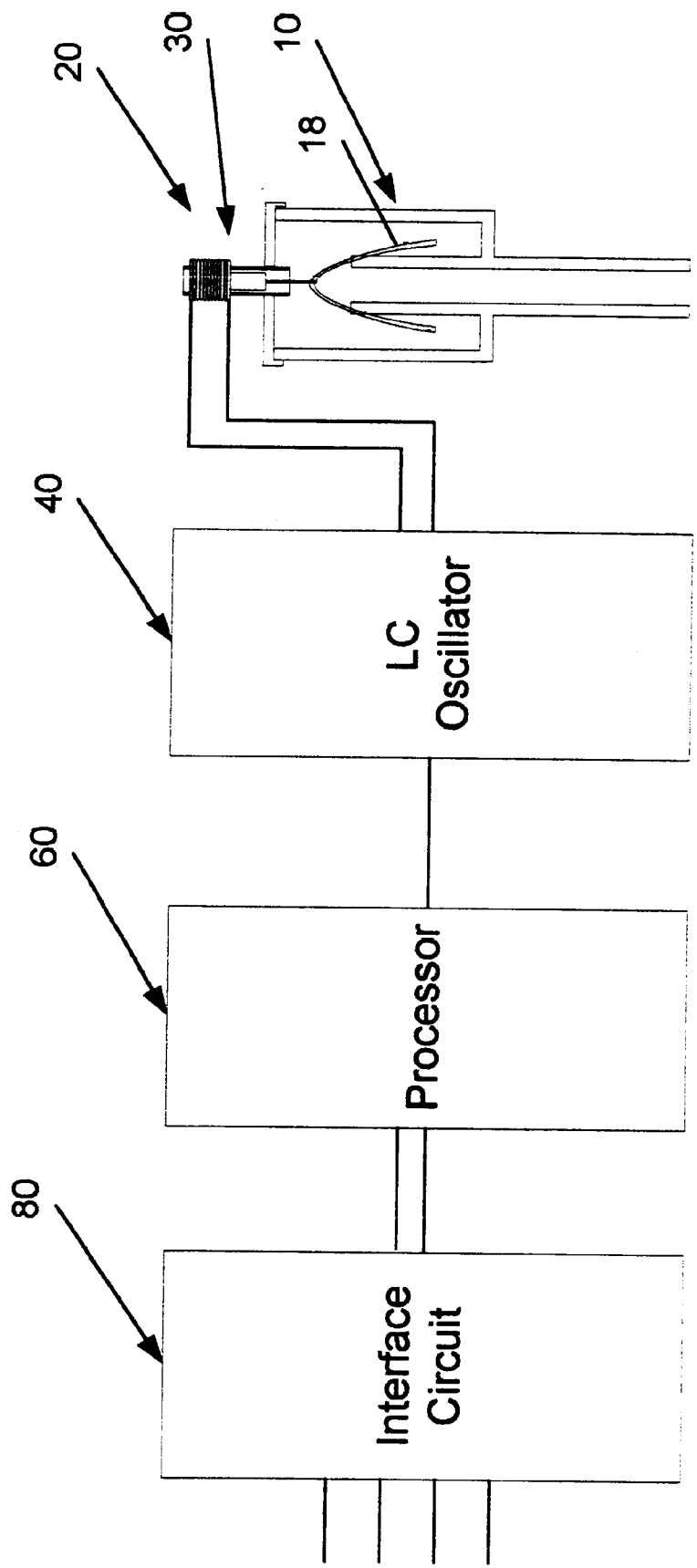
FIG. 2 shows a block diagram of the components of this invention.

The present invention will now be described with reference to the drawings. FIG. 2 shows the four subcomponents of my invention, which are; airlock-sensor assembly 20, LC oscillator 40, processor 60, and interface circuit 80. First, the airlock sensor assembly 20, which consists of an airlock assembly 10 and an inductor assembly 30 is responsible for translating movement within the airlock assembly to a change in inductance of said inductor assemble 30. Inductor assembly 30 forms the inductive component of LC oscillator circuit 40. LC oscillator circuit 40 produces a square wave output of a frequency that varies with inductor assembly 30. The square wave output of the LC oscillator is connected to a processor 60. Processor 60 performs three functions. First, it counts each rising edge of the LC oscillator square wave output for a period of time (T1). The count for each time period is stored in a buffer and statistical analysis is performed to determine if air has escaped from the airlock. Processor 60 also drives interface circuit 80. Interface circuit 80 provides electrical isolation between the components of this device and any external recording device. A detailed description of each subcomponent is given in the following paragraphs.

Airlock Sensor

Figure 3:
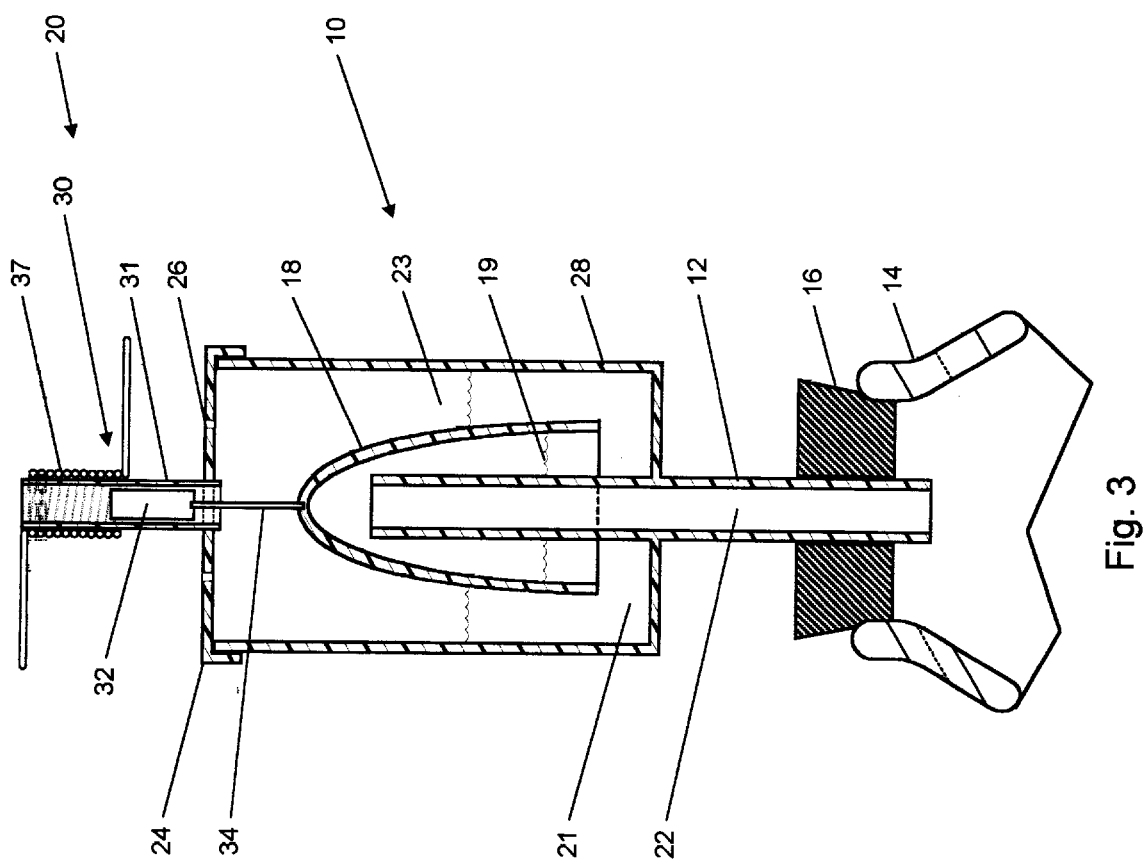
FIG. 3 shows a cross section of the airlock sensor assembly.

FIG. 3 shows the airlock sensor assembly. Gasses produced by fermentation enter the airlock through intake tube 12, which extends into the fermentation vessel 14 through a hole in stopper 16. Stopper 16, made of cork or rubber, forms an airtight seal with fermentation vessel 14. Therefore, fermentation gasses can only escape through intake manifold 22, which is formed by intake tube 12. The airlock also consists of a reservoir container 28 for holding a fluid such as water, and an airlock partition 18. Partition 18 separates intake manifold 22 from exit manifold 23 and extends into fluid contained in reservoir 21 such that gasses cannot pass freely from intake manifold 22 to exit manifold 23. Gasses can freely flow form exit manifold 23 to the ambient air through airlock lid holes 26. Airlock partition 18 is in the shape of a cup and covers the portion of the intake tube that is inside the reservoir 21, which is formed by reservoir container 28. Reservoir container 28 and intake tube 12 are typically one piece and typically made of plastic or synthetic resin.

The interior of the fermentation vessel 14 is isolated from the ambient air by filling the reservoir container 28 with a fluid such that the initial fluid level is between the opening at the bottom of airlock partition 18 and the top of the intake tube 12.

Attached to airlock partition 18 is connector rod 34. Attached to connector rod 34, is inductor ferrite core 32. Airlock partition 18, connector rod 34, and inductor ferrite core 32 move as one piece. Inductor assembly 30 is comprised of inductive coil 37 and non-conductive hollow tube 31. Inductor ferrite core 32 is disposed inside said non-conductive hollow tube 31 such that movement of said inductor ferrite core 32 causes a change in the inductance of inductor assembly 30. Inductor assembly 30 forms the inductive element of an LC oscillator, which is further described in the section titled LC Oscillator. Partition 18, connector rod 34, inductor ferrite core 32, and inductor ferrite core 37 form a ferrite core support means for securing ferrite core 32 such that motion of said partition 18 causes motion of said ferrite core 32 within inductive coil 37, causing a change in the inductance of the coil.

Carbon dioxide gas released by the fermentation process causes the pressure within the intake manifold 22 to increase. This pressure forces airlock partition 18, connector rod 34, and inductor ferrite core 32 to rise. Said pressure also and forces fluid level 19 inside airlock partition 18 to decrease.

When a sufficient pressure inside the intake manifold 22 is reached, fermentation gasses escape from under airlock partition 18. This causes airlock partition 18, connector rod 34, and inductor ferrite core 37 to rapidly fall back toward intake tube 12. This rapid fall causes a correspondingly rapid decrease in the inductance of inductor 30. The fermentation gasses escape the airlock through airlock lid holes 26 or through the seal between airlock lid 24 and the reservoir container 28.

LC Oscillator

Figure 4:
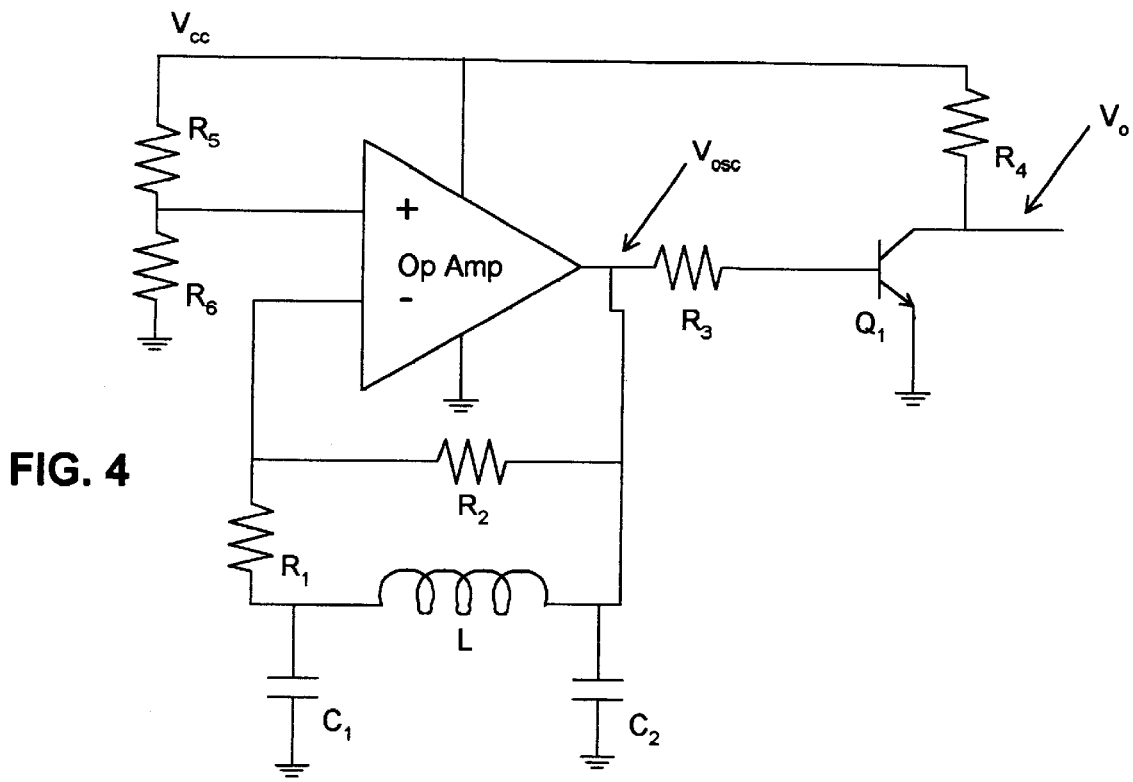
FIG. 4 shows a schematic of the oscillator.
Figure 5:
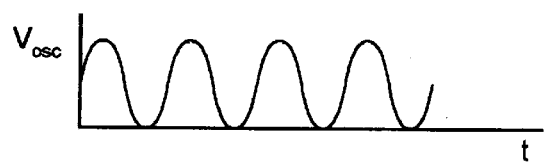
FIG. 5 shows the voltage output of the oscillator circuit
Figure 5:
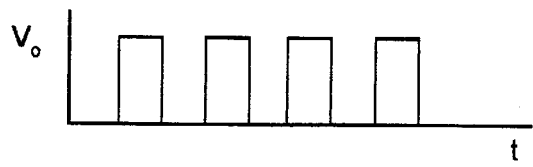

Explained next with references to FIGS. 3 and 4 is the LC Oscillator, which generates a square wave with a frequency that varies with inductor assembly 30. This provides a means of generating a voltage that varies in frequency with the value of said inductive coil 37 by using the coil as an inductive element in a oscillator. FIG. 4 shows a Colpitts oscillator, which is suitable for producing an AC voltage with frequency that varies with the value of an inductor. The Op Amp, resistors R1 and R2, capacitors $C_1$ and $C_2$, and inductor L form the Colpitts oscillator. Capacitors $C_1$ and $C_2$ form the capacitive reactance and inductor L forms the inductive reactance that provides the 180° feedback necessary for oscillation to occur. Resistors $R_5$ and $R_6$ form a voltage divider that allows the circuit to operate using a single power supply. Although FIG. 4 shows a Colpitts oscillator, it is possible that the same effect can be realized with any oscillator that uses an inductor as a reactive element. The output of the oscillator $V_{osc}$ closely resembles a sin wave.

Resistors $R_3$ and $R_4$, and transistor $Q_1$ convert the sinusoidal output voltage $V_{osc}$ into a square wave voltage $V_0$.

From the LC oscillator circuit in FIG. 4 the following equation can be obtained for the frequency f of the output voltage $V_0$:

$$f_0 = \frac{1}{\sqrt{C_t L}}; \quad \text{where } C_t = \frac{C_1 C_2}{C_1 + C_2} \qquad \text{Eqn 1}$$

From Eqn 1, it can be seen that as the value of the inductor increases, the frequency of the output voltage decreases. Likewise, as the value of the inductor decreases, the frequency of the output voltage increases. In reference to FIG. 3, as airlock partition 18 pushes inductor ferrite core 32 further inside inductive coil 37, the inductance of inductive coil 37 increases—leading to a decrease in frequency of the output voltage $V_0$ Likewise, as airlock partition 18 falls back towards intake tube 12, the inductor ferrite core 32 falls, evacuating from inside inductive coil 37. This reduces the inductance of inductive coil 37, resulting in an increase in the frequency of output voltage $V_0$.

In reference to FIG. 2, processor 60 monitors the LC Oscillator output voltage $V_0$ and measures its frequency $f_0$. From this measurement, said processor determines if air has escaped from the airlock and produces an output that can be recorded. Said processor is further described in the section titled Processor.

Processor

As shown in FIG. 2, the output of the LC oscillator 40 is connected to a processor 60. Said output of the LC oscillator 40 is described as LC Oscillator voltage $V_0$ in the previous section. Processor 60 performs three functions. First, it measures the frequency of the output of the LC Oscillator by counting the number of voltage transitions in a single direction of the electrical signals generated by the LC oscillator square wave output for a period of time (T1). This is accomplished by either counting the number of positive going edges or the number of negative going edges of voltage $V_0$ for a period of time. If said period of time is equal to one second, the voltage transition count would equal the frequency of $V_0$. A single measurement of the voltage transition count for a period of time is denoted by the letter F.

Second, a series of the most recent voltage transition counts (F) are stored in a memory buffer. The maximum number of stored voltage transition counts is designated by N. Once the number of voltage transition counts stored equals N, new voltage transition counts over write the oldest voltage transition count so that the total number of stored voltage transition counts equals N.

Net, in order to detect gasses escaping from the airlock using an inductive coil that has a non-critical tolerance, the most recent measurement of the voltage transition count is compared to the average and standard deviation of the stored voltage transition counts. This eliminates critical tolerance in the inductor because each measurement is compared relative to older measurements.

Finally, the decision of whether or not air has escaped from the airlock is made by counting the number of times the voltage transition count is less than a threshold. This threshold is calculated by the following formula.

$$\text{Threshold} = \text{Avg} - K(\text{SDev}) \qquad \text{Eqn 2}$$

Where:

Avg is the average of the stored voltage transition counts,

SDev is the standard deviation of the stored voltage transition counts,

K is an experimentally determined constant (typically 1).

Figure 6:
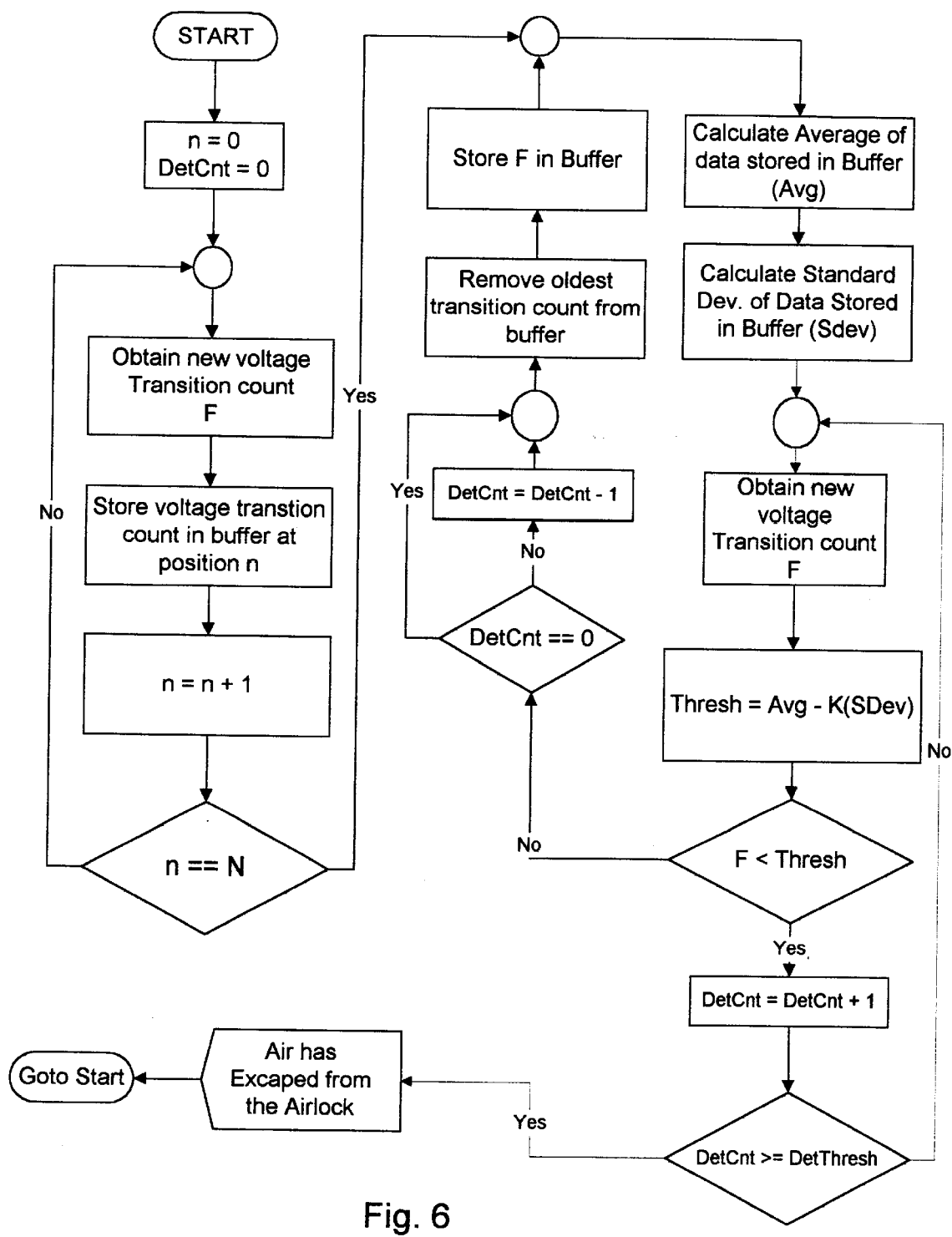
FIG. 6 shows a flowchart of the processing used to clearly indicate the event of air escaping the airlock

The Processor operation is described in more detail with respect to the flowchart in FIG. 6. The number of voltage transition counts stored in the buffer, n, is set to zero. Also the number of times the voltage transition count is greater the threshold (DetCnt) is set to zero. Next, series voltage transition counts are stored in a memory buffer. The total size of the memory buffer, and thus, the total maximum number of voltage transition counts stored is designated by N. Once the memory buffer is filled, the Average (Avg) and t the Standard Deviation (SDev) of the data stored in the memory buffer is calculated.

At this point, the device is ready to begin to detect air escaping from the airlock The Threshold, Thresh, is calculated using equation 2, and a new measurement of the voltage transition count, F, is made. If F is less than or equal to the threshold, the event of air escaping from the airlock is unlikely. The number of times the voltage transition count is greater than the threshold (DetCnt) is decremented if it is not equal to zero. The oldest voltage transition count is removed from the memory buffer, and the most recent measurement, F, is stored. Finally, a new average and standard deviation is calculated and the process begins again with a new measurement of the voltage transition count.

If F is greater that the threshold, the event of air escaping from the airlock is likely. The number of times the voltage transition count is greater than the threshold (DetCnt) is incremented. DetCnt is compared to an experimentally determined value DetThresh. If DetCnt is equal to DetThresh, the device indicates that gasses have escaped from the airlock If DetCnt is less than DetThresh, a new voltage transition count is made.

I claim:

1. An airlock which generates electrical signals that indicate gasses have flowed from an intake manifold to the ambient atmosphere, the airlock comprising:

(a) a reservoir container containing a fluid;

(b) an intake manifold into which gasses enter the airlock;

(c) an exit manifold from which gasses can escape to the ambient atmosphere;

(d) a partition separating the intake manifold from the exit manifold and extending into the fluid contained within the reservoir container such that gasses cannot freely pass between the intake manifold and the exit manifold (e) an inductor assembly comprised of an inductive coil, a ferrite core, and a ferrite core support that attaches the ferrite core to the partition such that motion of the partition causes motion of the ferrite core within the inductive coil, causing a change in the inductance of the coil;

(f) a means of an electrical signal by generating a voltage that varies in frequency with the value of said inductive coil by using the coil as the inductive element in an oscillator.

2. A method of monitoring said electrical signals generated by the airlock of claim 1, and producing a second electrical signal that distinctly indicates the event of gas escaping from said airlock, wherein the following steps take place:

(a) counting the number of voltage transitions in a single direction of the electrical signals generated by the airlock of claim 1 over a period of time;

(b) storing a series of said voltage transition counts;

(c) calculating the average and standard deviation of said series;

(d) calculating a threshold based on the average and standard deviation;

(e) comparing each count of the number of voltage transitions with said threshold and counting the number of times the measurement falls below the threshold;

(f) triggering said second electrical signal when the count mentioned in claim 4e reaches a particular value;

(g) resetting said second electrical signal by an acknowledgment signal.

* * * * *